US006981876B2

(12) United States Patent
Bleckley et al.

(10) Patent No.: US 6,981,876 B2
(45) Date of Patent: Jan. 3, 2006

(54) ERGONOMIC MOTION AND ATHLETIC ACTIVITY MONITORING AND TRAINING SYSTEM AND METHOD

(75) Inventors: Delmar Bleckley, Lilburn, GA (US); George Kelnhofer, Duluth, GA (US); Oswald Drowdy, Hampton, GA (US)

(73) Assignee: Accelerized Golf, LLC, Atlanta, GA (US)

( * ) Notice: Subject to any disclaimer, the term of this patent is extended or adjusted under 35 U.S.C. 154(b) by 0 days.

(21) Appl. No.: 10/862,044

(22) Filed: Jun. 7, 2004

(65) Prior Publication Data

US 2004/0219964 A1 Nov. 4, 2004

Related U.S. Application Data

(63) Continuation of application No. 10/086,392, filed on Mar. 1, 2002, now Pat. No. 6,786,730.

(51) Int. Cl.
*G63B 69/00* (2006.01)

(52) U.S. Cl. .................. 434/252; 434/247; 434/257

(58) Field of Classification Search ........ 434/247–255, 434/257, 307 R, 365, 428; 348/554, 578, 348/155; 463/1, 43; 482/8, 901–903; 382/103, 382/232, 112, 165; 707/104.1; 473/221; 725/131; 385/25; 342/25 A; 351/214
See application file for complete search history.

(56) References Cited

U.S. PATENT DOCUMENTS

| | | | | |
|---|---|---|---|---|
| 3,740,115 A | * | 6/1973 | Cole ........................... 385/25 |
| 4,707,697 A | * | 11/1987 | Coulter et al. ............ 342/25 A |
| 5,184,295 A | * | 2/1993 | Mann ......................... 473/221 |
| 5,554,033 A | * | 9/1996 | Bizzi et al. .................. 434/247 |
| 5,697,791 A | * | 12/1997 | Nashner et al. ............. 434/247 |
| 5,729,471 A | * | 3/1998 | Jain et al. .................... 725/131 |
| 5,846,086 A | * | 12/1998 | Bizzi et al. .................. 434/247 |
| 5,980,429 A | * | 11/1999 | Nashner ........................ 482/8 |
| 5,984,684 A | * | 11/1999 | Brostedt et al. ............. 434/252 |
| 6,081,608 A | * | 6/2000 | Fujii et al. .................. 382/112 |
| 6,126,449 A | * | 10/2000 | Burns ......................... 434/252 |
| 6,159,016 A | * | 12/2000 | Lubell et al. ............... 434/247 |
| 6,299,310 B1 | * | 10/2001 | Reis ........................... 351/214 |
| 6,377,309 B1 | * | 4/2002 | Ito et al. ..................... 348/554 |
| 6,392,710 B1 | * | 5/2002 | Gonsalves et al. .......... 348/578 |
| 6,396,534 B1 | * | 5/2002 | Mahler et al. .............. 348/155 |
| 6,450,888 B1 | * | 9/2002 | Takase et al. ................. 463/43 |
| 6,513,046 B1 | * | 1/2003 | Abbott et al. ............ 707/104.1 |
| 6,537,076 B2 | * | 3/2003 | McNitt et al. .............. 434/252 |

(Continued)

*Primary Examiner*—Joe H. Cheng
(74) *Attorney, Agent, or Firm*—Philip H. Burrus, IV

(57) ABSTRACT

This invention includes a system for teaching and learning a preferred ergonomic motion. The system includes a video camera for capturing successive images of a person executing an ergonomic motion. The system includes a threshold definition system that allows a user to define a spatial region of the video image through which motion should or should not interfere. If the spatial region is interfered, the system actuates an alarm, thereby providing feedback so the user may alter the technique of the next attempted motion. In one preferred embodiment, the system is used in teaching a golfer to execute a preferred golf swing. The golfer adjusts the spatial region to define a space through which neither the golfer's body nor club should pass. If the spatial region is intruded upon, an alarm is actuated. For example, the golfer may define the region such that if the club moves off plane during a swing, a tee removal system causes the ball to disappear. In this manner, the golfer is only able to hit the ball when the club stays on plane. The invention works with reverse logic as well, and may equally be applied to any number of ergonomic activities.

10 Claims, 7 Drawing Sheets

U.S. PATENT DOCUMENTS

| | | | |
|---|---|---|---|
| 6,633,673 B1 * | 10/2003 | Shen | 382/232 |
| 6,685,480 B2 * | 2/2004 | Nishimoto et al. | 434/247 |
| 6,722,888 B1 * | 4/2004 | Macri et al. | 434/247 |
| 6,724,915 B1 * | 4/2004 | Toklu et al. | 382/103 |
| 6,749,432 B2 * | 6/2004 | French et al. | 434/247 |
| 2004/0170318 A1 * | 9/2004 | Crandall et al. | 382/165 |

* cited by examiner

ERGONOMIC MOTION AND ATHLETIC ACTIVITY MONITORING AND TRAINING SYSTEM AND METHOD

This is a continuation application of U.S. patent application Ser. No. 10/086,392, filed Mar. 01, 2002 now U.S. Pat. No. 6,786,730 B2, which is incorporated herein by reference.

BACKGROUND

1. Technical Field

This invention relates generally to systems and methods for monitoring ergonomic motion, and more particularly to a system and method for learning and teaching a preferred repetitive movement by establishing a spatial region and monitoring entry or exit of the spatial region by way of a feedback alarm.

2. Background Art

Athletes are constantly looking for ways to improve their technique. This is especially true in the game of golf. To paraphrase Homer Kelley, author of *The Golfing Machine*, a golf stroke is not a basic procedure, but rather basic geometry involving the geometry of the circle and the physics of rotation. In other words, golf is not a game of proper positions, but rather a game of proper alignment. Many a weekend golfer becomes frustrated when told to "keep your arm straight" or "keep your head down" without a sufficient explanation as to why. It is of little comfort when an advisor's only justification is "because Jack Nicklaus did it that way."

However, with a little bit of scientific analysis, the golf stroke, as does all athletic activity, becomes understandable and may be analyzed with more precision. This is true because the fundamental laws of physics govern athletic activity just as they do the tasks of everyday life. Simply put, everyone must obey the laws of physics in every activity. They govern life in the twenty-first century just as they did in the first century. Understanding their effect on the golf swing brings clarity to the mystery of golf. In the words of Kelley, "When the facts are understood, the illusions not only cease to mislead but can be utilized."

This is best illustrated by way of example. A simple example is the concept of the swing plane in golf. Referring now to FIG. 1, illustrated therein is a golfer 100 addressing a ball 101. The club shaft 102 represents the first line 104 in the swing plane equation. The imaginary line running from the ball 101 to the target 106, known as the "target line" 103, forms the second line. To swing a golf club with maximum efficiency and mechanical advantage, these two lines—the shaft line 104 and the target line 103—must always intersect. In geometric terms, two intersecting lines are known as "coplanar" lines. Many teaching professionals and scientific analysts suggest that the optimum golf swing is one in which the golfer always keeps the club shaft 102, and thus the line 104 represented by the club shaft 102, coplanar to the target line 103.

To see why this would appear to be true, imagine what would happen if the two lines 103,104 were not coplanar, i.e. intersecting, at the moment the golfer 100 tried to make contact with the ball 101 (known as the "impact point"). In other words, if the shaft line 104 did not point to and intersect the target line 103 when the club head 105 got to the ball 101, the golfer 100 would miss, or "whiff", the ball 101. Whiffing the ball, as anyone who has played golf knows, is responsible for many a profane word, thrown or broken club and unpleasant disposition.

The golfer has only a finite amount of energy with which to strike the ball. If the club shaft and target line become "skew", i.e. not coplanar, then the golfer would need to use some of that finite power to physically redirect the club into a coplanar alignment with the target line. If he does not do so, he will miss the ball. Energy that is used in redirection cannot be used to propel the ball towards the target. Simply put, when the club gets out of plane, the golfer loses both control and distance. Many teachers suggest, therefore, that the easiest way to swing, with the most power and most mechanical advantage, within the limits of human motion, is thus to always keep the club shaft and target line coplanar. This coplanar relationship is generally known as being "on plane".

Golf instructors who are proponents of this approach have developed numerous teaching aids to help the golfer stay on plane. One such device is a rigid circle, often made of plastic pipe. The circle represents one plane upon which the golfer swings. The problem with this solution is that the circle represents one fixed plane at a fixed angle. For the human golfer, it has been suggested the plane angle actually shifts to a more upright angle during the back swing, and then to a flatter angle during the downswing. In other words, while the golfer is swinging, the club shaft and target line are always coplanar, but the angle of that plane actually changes relative to the ground. With the plastic pipe, however, the angle of the plastic circle stays constant. Thus, when the golfer is in a portion of the swing in which the angle of his plane is greater than that of the plastic circle, the circle ceases to be effective as a training aid. He may still have the club "in plane", yet will not be in contact with the circular ring. This is illustrated in FIG. 2.

Another such training aid is a rigid arm that couples to the center of the club shaft and affixes to a wall. When the golfer swings, the rigid arm causes the shaft to trace a circular motion that resembles the swing. The problem with this aid is that it is based upon the premise that the head is the center of the swing. Many teachers suggest, however, that in reality, the center of the swing is (for the right handed golfer) much closer to the left shoulder. (The fundamental structure in the golf swing being a form III lever assembly formed by the left shoulder, the hands and the club head.) When the left shoulder moves back away from the target line during the follow through, the rigid arm coupled to the fixed wall is incapable of following the shoulder. Consequently, the golfer is thrown off plane during the follow through.

While swing plane works well as one illustrative alignment, there are many other alignments that must be monitored as well. These include shoulder alignment, torso alignment, hip alignment, arm alignment, hand alignment, and head alignment, just to name a few. Additionally, some professionals subscribe to alternate approaches. They may teach techniques that do not embrace the coplanar approach. They instead teach systems that each have their own signature alignments.

It would be advantageous to be able monitor these alignments of the golf swing, as well as provide feedback to the golfer when a preferred motion was not made. Additionally, there are similar needs with respect to other ergonomic motions, including other sports, physical therapy, work related human motion, animal training and the like. There is thus a need for a system that is capable of monitoring human ergonomic motion and providing feedback to assist the user in learning preferred techniques of motion.

DETAILED DESCRIPTION OF A PREFERRED EMBODIMENT

Figure 1:
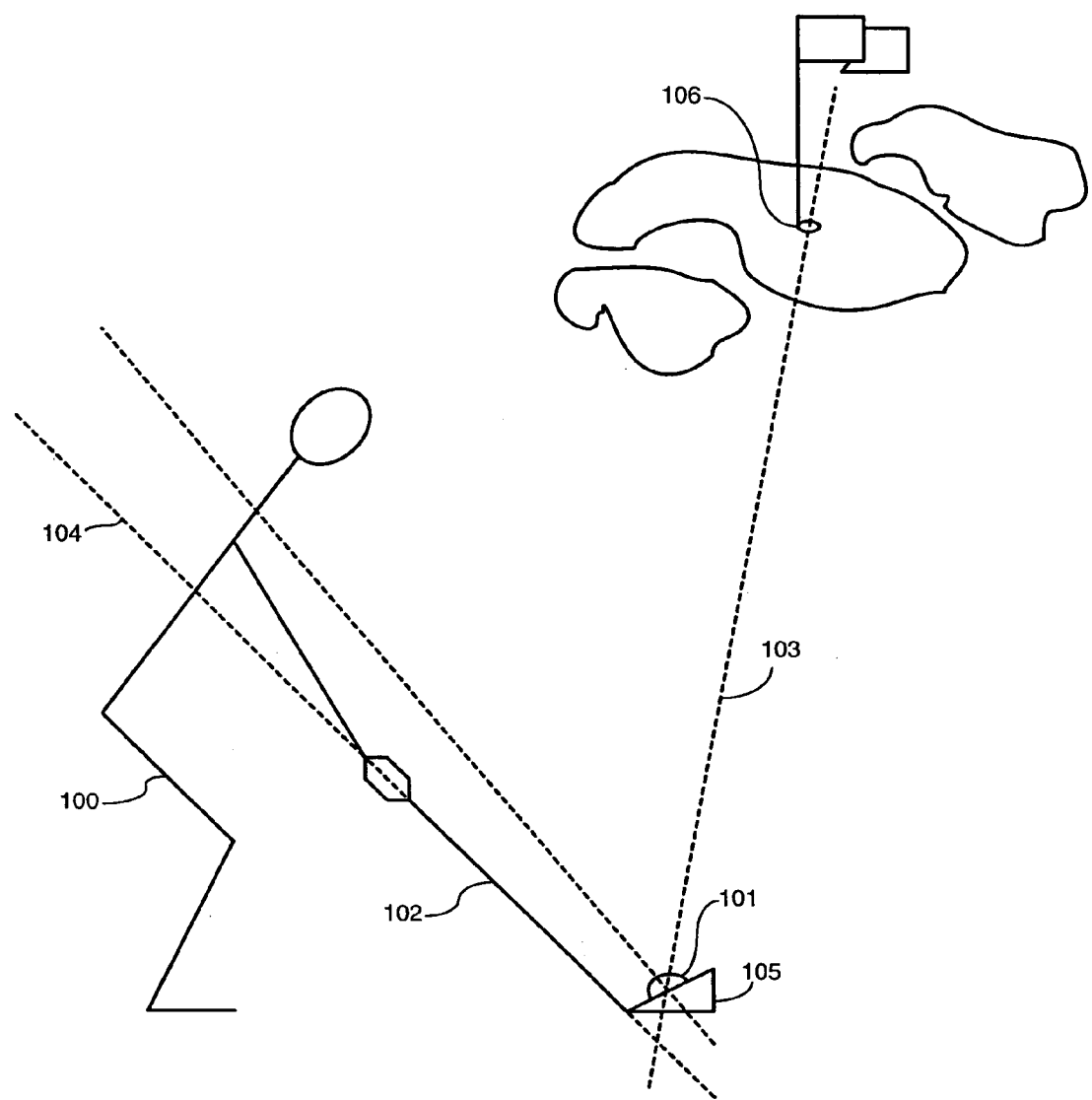
FIG. 1 is an illustration of a golfer addressing a ball with plane lines and target line indicated.
Figure 2:
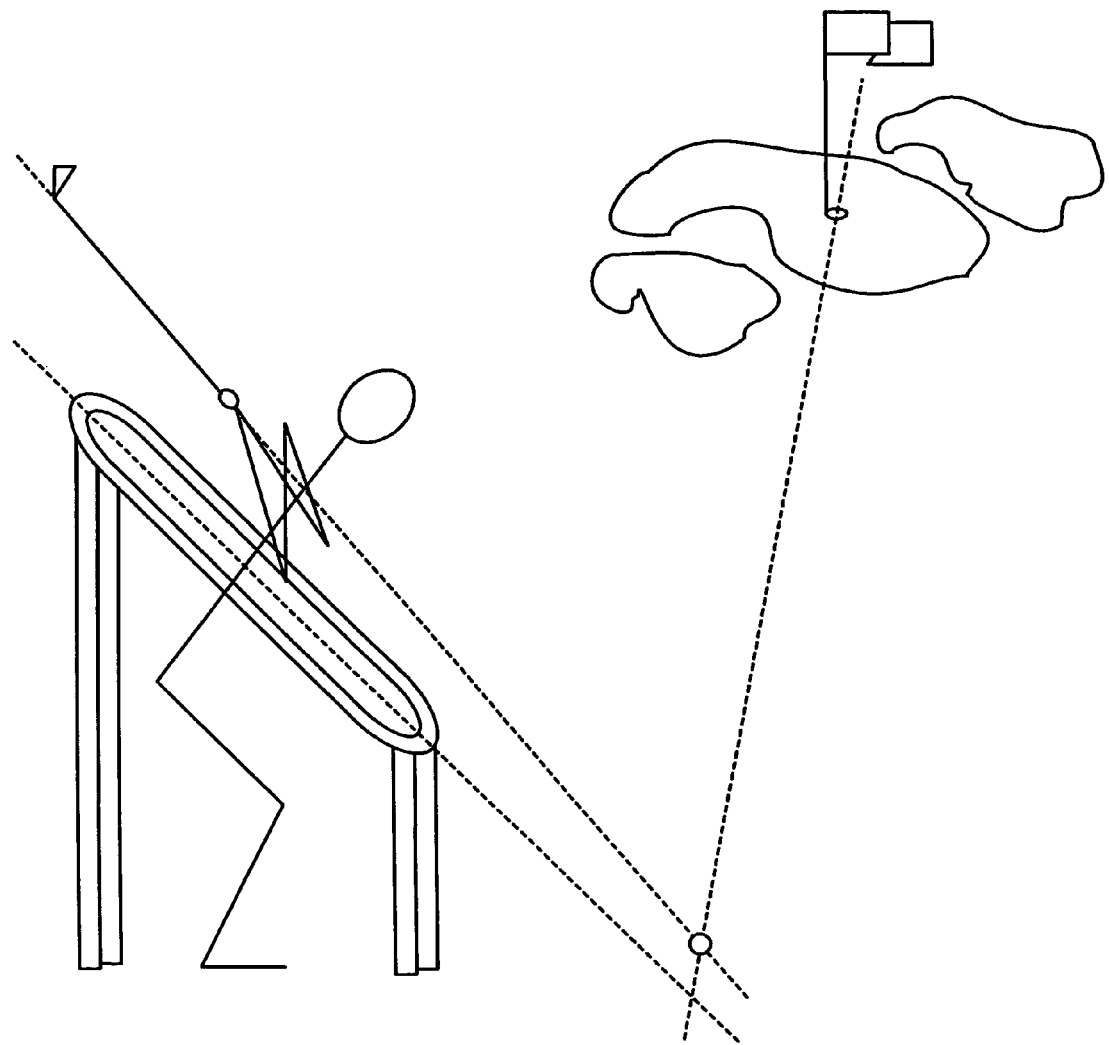
FIG. 2 is a prior art solution intended to teach the proper swing plane.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 3:
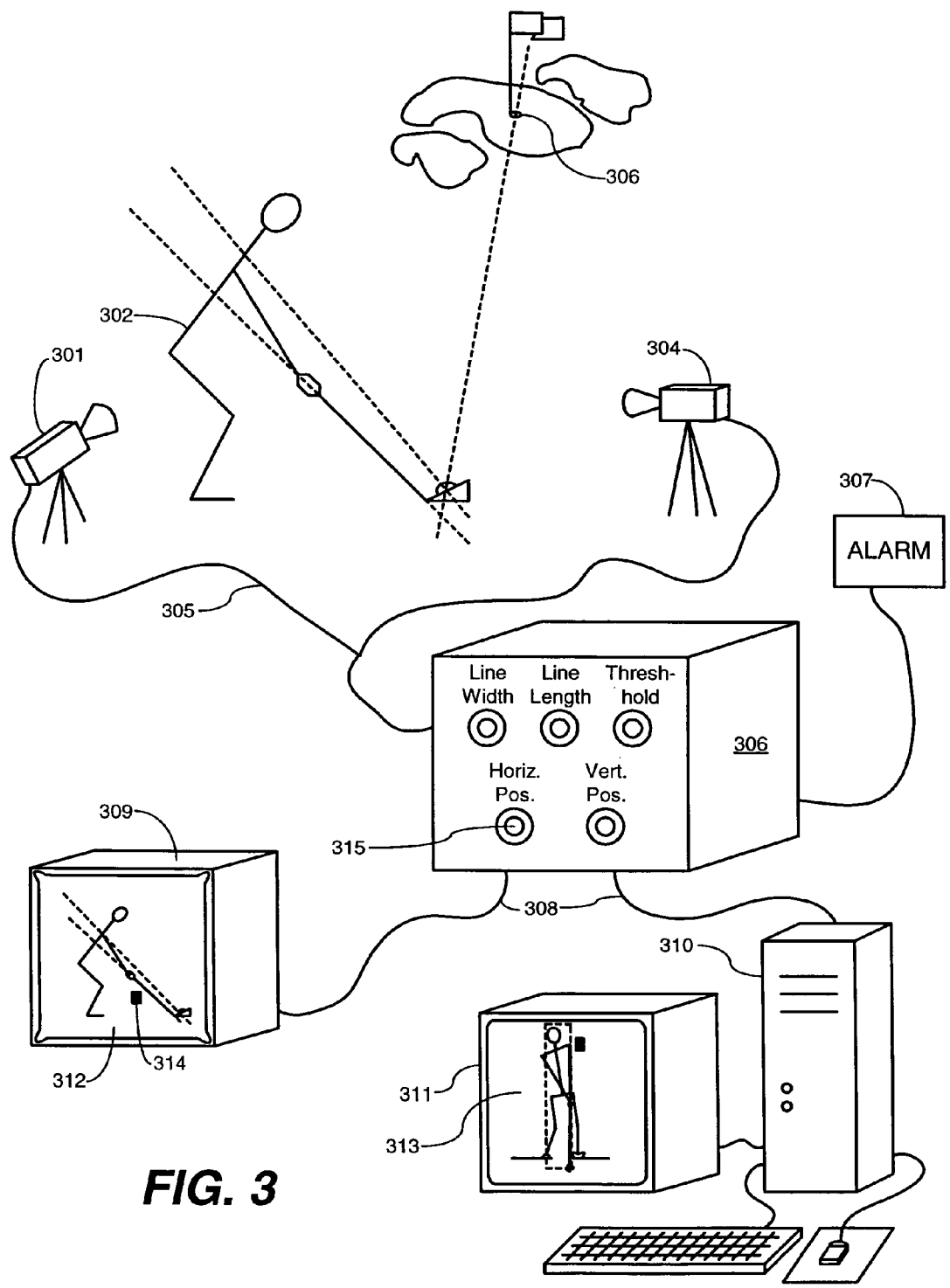
FIG. 3 is an illustration of one preferred embodiment of an ergonomic motion and athletic activity monitoring and training system in accordance with the invention.

Referring now to FIG. 3, a preferred embodiment of the invention is illustrated therein. A video camera 301 is positioned directly behind a golfer 302, such that the camera is essentially in line with the golfer 302 and the target 303. The camera 301 is positioned behind the golfer 302 when swing plane or other alignments visible from behind are to be analyzed. For users with access to two cameras, a second camera 304 is positioned in front of the golfer for analysis of hip, shoulder, torso, hand alignments and the like. In the alternative, for users with a single camera, the first camera 301 may simply be moved to the position of camera 304 when frontal views are required. While the view from behind and the frontal view are preferred views, as today's camera technology has produced cameras smaller than tennis balls, it will be obvious to those of ordinary skill in the art that a camera could be placed in any position to view alignments from any angle.

The camera output 305 may be in digital form or analog form. The output 305 is coupled a threshold definition system 306. The coupling may be via a wire or wireless. The threshold definition system 306 allows the user to define spatial areas through which the golf swing must not pass. The threshold definition system output 308 may then be coupled to either a conventional video monitor or television 309, or to a personal computer 310 having a video card and a monitor 311. Image 312 shows the preferred view from behind the golfer, and image 313 shows the preferred frontal view.

The threshold definition system allows the user to define a spatial area, depicted as a two dimensional region 314 on the video image, known as a"box", through which the golf swing must not pass. If the golf swing does pass through the box, the threshold definition system actuates an alarm 307. This alarm 307 may be visual, aural, or sensory. It may also be a tee manipulation device that causes the ball to "disappear" as recited in U.S. Pat. No. 6,261,189, entitled "Human Movement and Golf Swing Monitoring and Training System", which is incorporated herein by reference. In this manner, the golfer is notified instantly if his swing has passed through an improper region. The tee manipulation device is but one form of a target manipulation device that removes the target when a preferred space has been violated. The target may be a ball, puck, shuttlecock or other equivalent or similar device.

For example, if the golfer 302 has a problem with his club head passing under the plane, the camera 301 will be placed behind the golfer 302 so as to show a view commiserate with plane analysis. Such a view is shown on the video monitor 309 as view 312. By tuning the knobs 315 on the threshold definition system 306, the user would establish a box 314 positioned just under the swing plane. The knobs 315 could equally be employed by way of joysticks, light pen, touchscreen, or other equivalent technology.

If the golfer makes a proper, on-plane swing, neither the club head nor club shaft will pass through the box 314. If however, the golfer inadvertently swings in such a way as to pass through the box 314, the threshold definition system will actuate the alarm 307. If the alarm 307 comprises a tee manipulation device, the ball will disappear as soon as the box 314 is encroached by the club head or shaft. In this manner, the golfer 302 would only be able to hit the ball when making an on-plane swing.

Figure 4A:
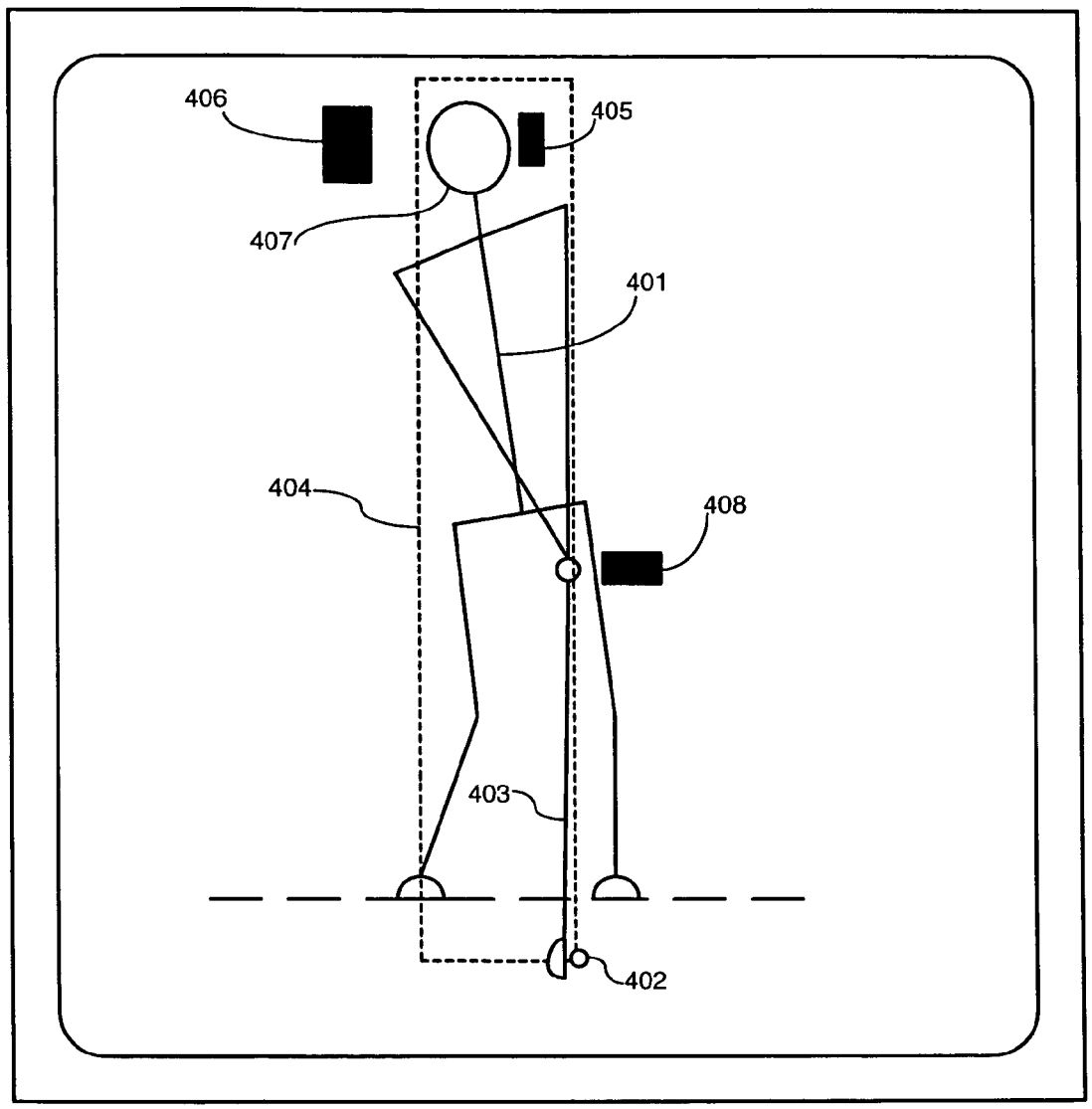
FIGS. 4A and 4B are illustrative embodiments of spatial regions corresponding to a preferred space for execution of a golf stroke in accordance with the invention.

Referring now to FIG. 4A, illustrated therein,are exemplary boxes of interest for the golf swing from a frontal view. The golfer 401 is shown with a club 403 addressing a ball. The dotted line box illustrates general boundaries within which the golfer 401 should stay throughout the swing. Such lines may be drawn on a video monitor with dry erase marker, or alternatively may be drawn with computer software when a computer having a video card is employed.

Box 405 may be used to monitor head motion. For a proper golf swing, the head 407 must not touch box 405 until after the ball 402 has been struck. Box 406 represents the horizontal limit to which the head 407 may move during the stroke. Consequently, if a golfer were having trouble with head motion, he could use the threshold definition system to establish the proper head motion limit. If this limit were violated during the swing, the alarm would actuate.

Box 408 may be used with the reverse logic to monitor movement such as hip movement. In a proper golf swing, it is suggested that the hips should not sway side to side. Thus, by employing reverse logic in the threshold definition system, the golfer 401 can cause the alarm to actuate if the hips leave, as opposed to enter, box 408.

Figure 4B:
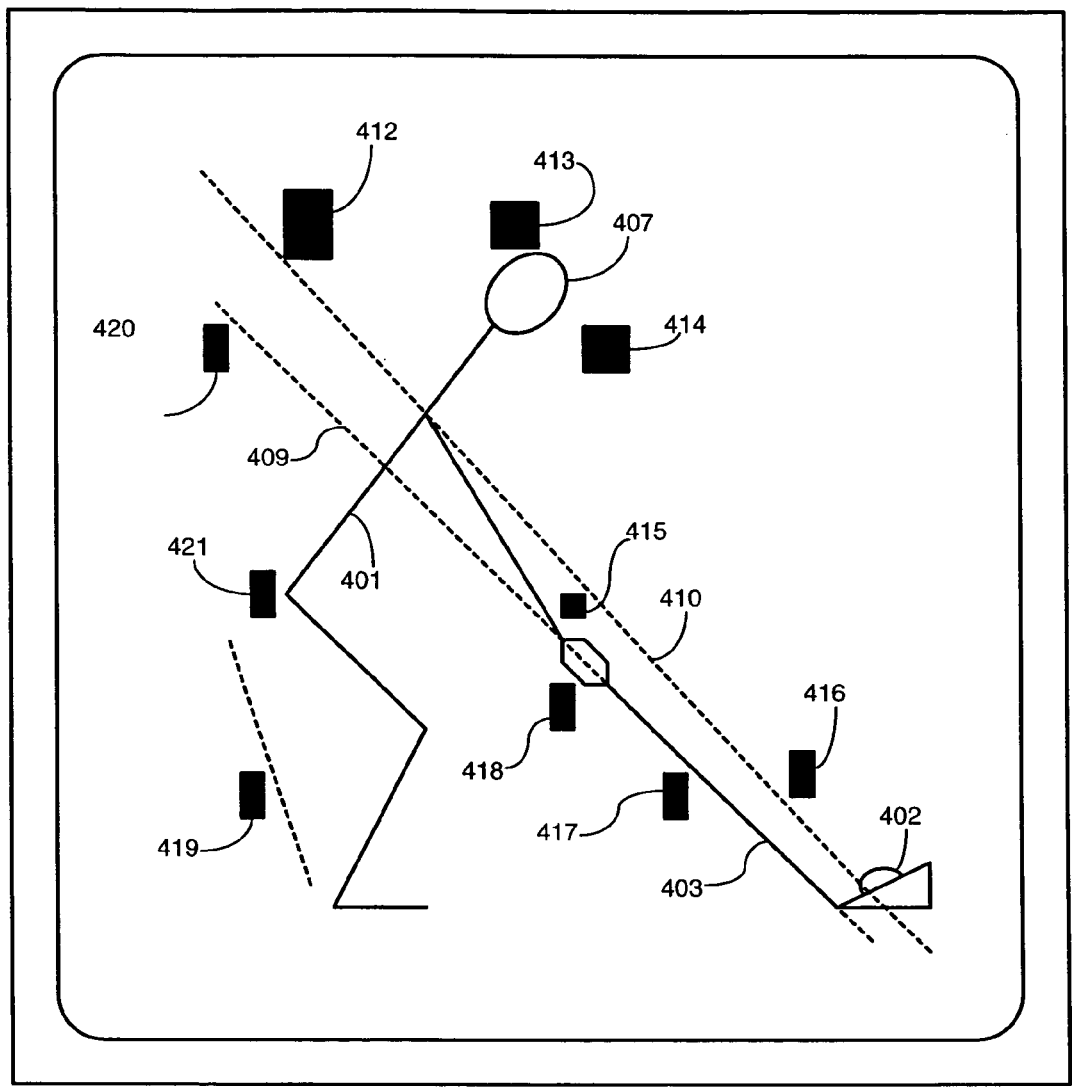

Referring now to FIG. 4B, illustrated therein is a rear view of the golfer 401 with several boxes of interest. Line 409 represents the "lower plane line" formed by the club 403 at address. Line 410 represents the "upper plane line" to which the golfer 401 shifts during the swing. Box 417 represents the limit defined by the lower plane line 409. If the golfer 401 swings through this box 417, the golfer 401 is off plane and the alarm should actuate. Box 419 represents the point through which the left leg should not pass at impact. Box 418 represents the point through which the knees should not pass during the golf swing. Box 420 represents the lower limit of the lower plane line through which the club should not pass during the swing. Box 412 represents the upper limit of the swing plane through which the club should not pass. Box 413 ensures that the head 407 does not move upward during the swing. Box 414 ensures that the head 407 does not dip during the swing. Box 416 represents the upper limit of the plane through which the club should not pass. Box 415 ensures that the hands do not extend outward during the takeaway. Box 421, again using negative logic, ensures that the rear stays in place during the swing. These are illustrative boxes only. It will be clear to those of ordinary skill in the art that any number of boxes could be established to address a particular swing fault.

Figure 5:
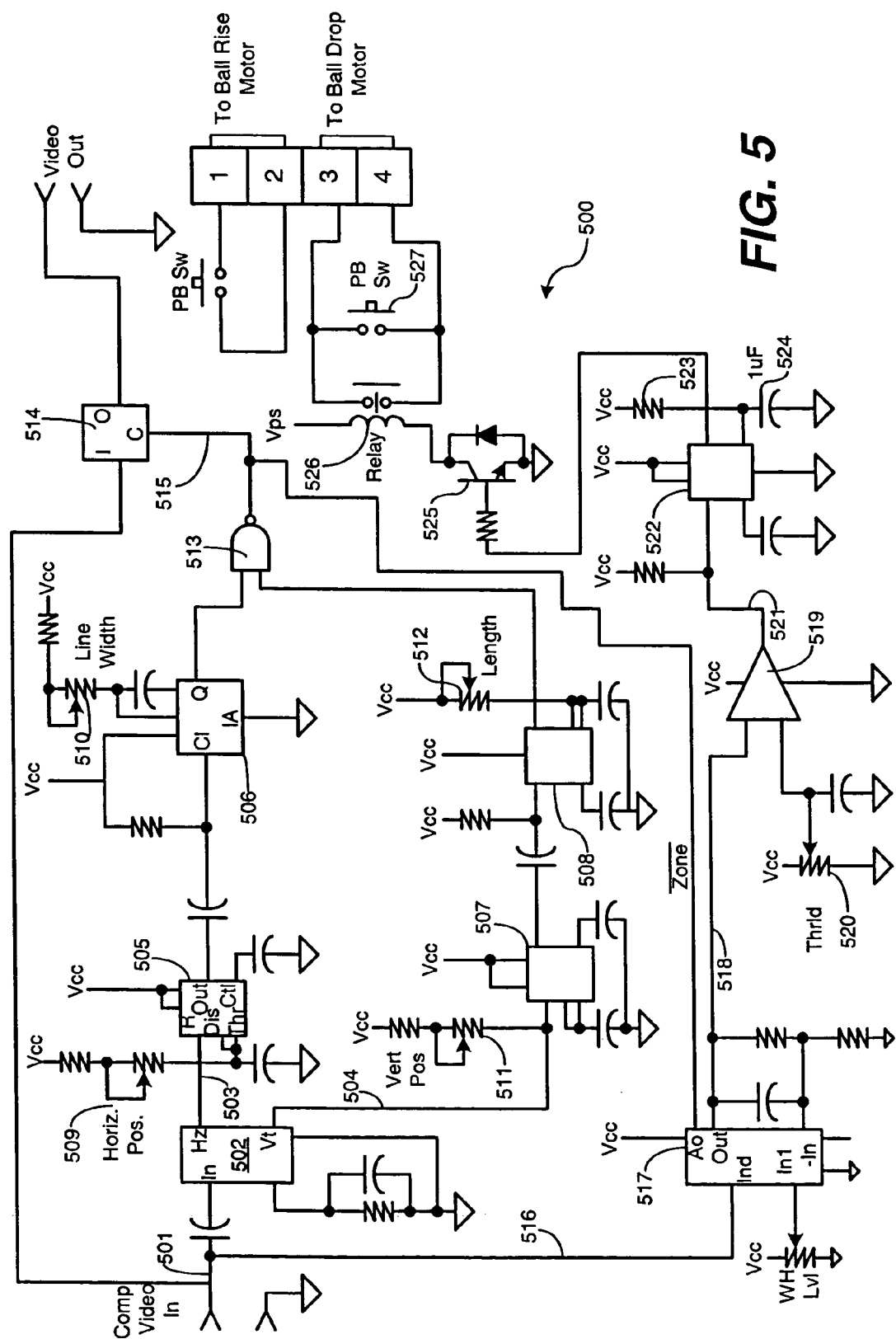
FIG. 5 is a schematic diagram of one preferred embodiment of threshold definition system in accordance with the invention.
Figure 6:
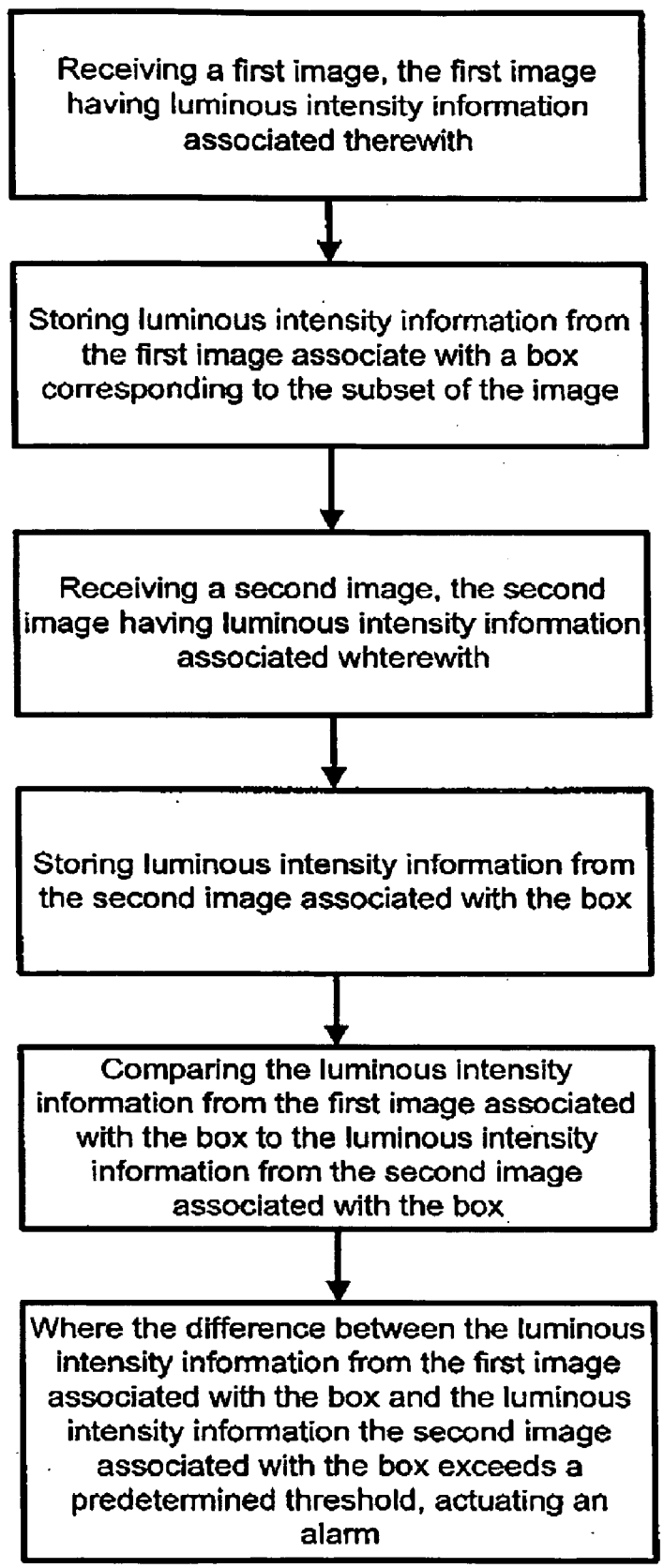
FIG. 6 illustrates one preferred embodiment in accordance with the invention.

Referring now to FIG. 5, illustrated therein is one preferred embodiment of the circuitry 500 for the threshold definition system. While this is an analog solution, it will be clear to those of ordinary skill in the art that the system could also be employed using digital circuitry. It should be kept in mind that the video signal is actually a time sequence of electronic signals representing different light intensities at different locations in the camera's field of view, and that the location of each picture element in the field of view has a fixed time relationship with all the other picture elements. Therefore, wherever a picture element is located on the viewing screen, the signal will return to that exact location once ever sweep of the screen—60 times per second. It's return each time will be precisely and predictably timed.

The analog video signal 516 couples to the circuit 500 at the input terminal 501. The input terminal 502 couples to a video sync separator 502 that separates the video signal 516 into a horizontal component 503 and a vertical component 504. An example of a suitable video sync separator is the LM1881 manufactured by National Semiconductor. The video sync separator 502 has an edged triggered vertical output. The circuit 500 utilizes this edge triggering to determine the precise start of each video screen sweep.

The horizontal signal 503 and vertical signal 504 are then fed into timers. The horizontal signal 503 couples to a timer 505 and multivibrator 506. The timer/multivibrator 505,506 combination is used for improved resolution. Examples include a LM556, manufactured by National Semiconductor, for timer 505 and a 74HC123 monostable multivibrator, manufactured by Texas Instruments, for multivibrator 506. Based upon the edge trigger of the video sync separator 502, the timer 505 defines the horizontal position of the box, while the multivibrator 506 defines the width of the box. Potentiometer 509 is used to adjust horizontal position, while potentiometer 510 adjusts the width of the box.

Timer 507 sets the vertical position of the box is set by a timer 507, and a second timer 508 defines the length of the box. Potentiometer 511 is used to adjust vertical position, while potentiometer 510 adjusts the length of the box. The potentiometers correspond to user interface knobs on the threshold definition system. The horizontal position and width of the box are then coupled with the vertical position and width via a NAND gate 513 coupled to a bilateral switch 514.

Thus, when the horizontal signal 503 is acted upon by the timer 505 and multivibrator 506, and the vertical signal is acted upon by the timers 507,508, the control pin 515 of the bilateral switch 514 is pulled low, thereby blocking out the video signal. At all other times, the video signal is allowed to pass to the monitor unencumbered. In this manner, the threshold area is projected as a box on the monitor.

Meanwhile, in parallel, the video signal 516 is fed into an audio amplifier, like the MAX453 audio amplifier manufactured by Maxim, for example. The amplified output 518 is coupled to a comparator 519 that compares the signal to an adjustable threshold 520 that corresponds to the luminous intensity of the amplified video signal 519. A timer 522 then latches the comparator output 521, holding the output for a single video sweep. A resistor 523 and capacitor 524 coupled to the timer 522 set this latch time. Thus, if the luminous intensity of the box changes from frame to frame, for example if a golf club head were to pass through the box, then the timer 522, by comparing the instant comparator output 521 to a latched value, would actuate a switch 525 that in turn actuates either an alarm or relay 526. The alarm or relay may then be reset with a mechanical switch 527.

To summarize the operation, the video camera delivers a video signal to the circuit 500. The horizontal 503 and vertical 504 signals then create a box by replacing the video signal with an area of predetermined, no-video signal color. By adjusting potentiometers 509,510,511,512, the user may determine the box's size, shape and location within the video image. A timer 522 stores luminous intensity of a video sweep, for the period of a single sweep, and a comparator is used to compare it with the real time signal to determine whether a change in luminous intensity has occurred. A significant change represents something entering the box. This, in turn, would trigger an alarm to provide the user with the appropriate feedback. The logic can be reversed to actuate the alarm upon exit from a box, as opposed to entry.

Through the use of potentiometers, the box may be lengthened or widened, as well as positioned anywhere on the video screen. Once the box is established, the luminous intensity threshold may be varied with a potentiometer as well. The circuit constantly monitors the box via a comparator. If, from one sweep to the next, the luminous intensity levels of the box are relatively the same, then there has been no intrusion into the box. However, if the selected area views an object with different luminous intensity, the alarm is triggered.

Another preferred embodiment of the invention employs software to perform the functions of the threshold definition system. Rather than using circuitry, the video image is coupled into a computer with a video card and image capture software. The video card digitizes the image into a matrix of pixels. Each pixel carries within luminous energy and color information. A computer program then allows the user to define the box, thereby storing the luminous and color information within the box. The program then compares the luminous and color information of successive images to that stored within the box. When the luminous and color change exceeds a predetermined threshold, the alarm is actuated.

While golf has been used as an exemplary embodiment, it will be clear that this invention is not so limited. One object of this invention is to assist or inform a user that a predetermined spatial area has been entered or exited. The sciences of biomechanics and ergonomics have taught us that whatever the physical activity is that is being performed, there are always more or less efficient ways to perform the task. As it is the desire in sports and other activities to maximize the performance, this invention provides a means of determining, in real time, whether the human motion has been adequately performed. Alarm feedback, be it aural, visual, mechanical, electrical, or other, allows the user to make adjustments that will lead to the ability to improve their performance.

The invention could be applied to other sports in addition to golf. For example, in tennis, one may want to set thresholds above and below which the racquet should not pass during a groundstroke. In baseball, a pitcher may want to define the limits of a strike zone or of pitching motion. In soccer, the player may want to define the proper arm motion for an inbound pass. In basketball, the player may want to define a height threshold below which the ball should travel during free throws. In football, a line coach may want to define lanes in which his linemen should stay during a pass rush. In weight lifting, the lifter may wish to define limits of motion to avoid strains and pulled muscles. In dance, the ballerina may want to determine limits of motion during a leap. In skating, a skater may want to define outer limits for a pirouette. Physical therapists may want to define limits for physical therapy. Animal trainers may use the invention to teach animals as well.

The invention could also be used for timing. A camera could be set at the start or finish line of a race. When the starting line box was entered, a clock may begin. When the finish line box was entered, the clock may stop. In an analog embodiment, the resolution would be limited to 16 milliseconds if the camera operates per the National Television Standard. Non-NTS standard cameras may have improved resolution. It will be clear that a digital embodiment, with a camera capable of taking thousands of frames per second would also improve this resolution.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while an analog circuit has herein been described, it will be clear that the invention could equally employ a camera having a digital output, with the threshold definition system could employ memory and a microprocessor to define boxes, threshold limits and alarm actuation.

We claim:

1. A method for executing an ergonomic action monitoring program, the method comprising the steps of:
   a. receiving a first image, the first image having luminous intensity information associated therewith;
   b. storing luminous intensity information from the first image associated with a box corresponding to a subset of the image;
   c. receiving a second image, the second image having luminous intensity information associated therewith;
   d. storing luminous intensity information from the second image associated with the box;
   e. comparing the luminous intensity information from the first image associated wit the box to the luminous intensity information from the second image associated wit the box; and
   f. where the difference between the luminous intensity information from the first image associated with the box and the luminous intensity information from the second image associated with the box exceeds a predetermined threshold, actuating an alarm.

2. The method of claim 1, further comprising the step of receiving user input and drawing the box based upon the user input.

3. The method of claim 2, wherein the ergonomic motion is selected from the group of activities consisting of golf, tennis, soccer, basketball, football, baseball, dance, weight lifting, physical rehabilitation exercises, animal training and racing.

4. The method of claim 2, wherein the box defines a preferred area of movement in a properly executed athletic motion of a component selected from the group consisting of hands, head, shoulders, legs, hips, knees, arms, torso, a golf club shaft and a golf club head.

5. The method of claim 2, wherein the alarm is selected from the group consisting of aural stimuli, optical stimuli, physical sensation stimuli, and a target manipulation device.

6. The method of claim 1, wherein the method is executed with the assistance of software operating on a computer.

7. A system for monitoring an ergonomic motion, the system comprising:
   a. an image receiving circuit;
   b. a processor coupled to the image receiving circuit, wherein a spatial region of a video image corresponding to a preferred execution area of the ergonomic motion may be defined, wherein the processor:
      i. stores information associated with the spatial region of a first image;
      ii. stores information associated with the spatial region of a second image;
      iii. compares the information associated with the spatial region of the first image to the information associated with the spatial region of the second image; and
      iv. triggers an alarm when the information associated with the spatial region of the first image differs from the information associated with the spatial region of the second image by at least a predetermined threshold.

8. The system of claim 7, wherein the ergonomic motion is selected from the group of activities consisting of golf tennis, soccer, basketball, football, baseball, dance, weight lifting, physical rehabilitation exercises, animal training and racing.

9. The system of claim 7, wherein the spatial region defines a preferred area of movement in a properly executed athletic motion of a component selected from the group consisting of hands, head, shoulders, legs, hips, knees, arms, torso, a golf club shaft and a golf lub head.

10. The system of claim 7, wherein the alarm is selected from the group consisting of aural stimuli, optical stimuli, physical sensation stimuli, and a target manipulation device.

* * * * *